(12) United States Patent
Ramesh et al.

(10) Patent No.: US 10,346,934 B2
(45) Date of Patent: Jul. 9, 2019

(54) APPARATUS FOR POWER THEFT DETECTION ON AN ELECTRICAL POWER GRID

(71) Applicant: Amrita Vishwa Vidyapeetham, Tamil Nadu (IN)

(72) Inventors: Maneesha Vinodini Ramesh, Kerala (IN); Aryadevi Remanidevi Devidas, Kerala (IN); P. Venkat Rangan, Tamil Nadu (IN)

(73) Assignee: Amrita Vishwa Vidyapeetham (IN)

( * ) Notice: Subject to any disclaimer, the term of this patent is extended or adjusted under 35 U.S.C. 154(b) by 1071 days.

(21) Appl. No.: 14/719,786

(22) Filed: May 22, 2015

(65) Prior Publication Data

US 2016/0035049 A1 Feb. 4, 2016

Related U.S. Application Data (60) Provisional application No. 62/032,207, filed on Aug. 1, 2014.

(51) Int. Cl.
  *G06Q 50/06* (2012.01)
  *H04W 4/38* (2018.01)
  (Continued)

(52) U.S. Cl.
  CPC .............. *G06Q 50/06* (2013.01); *H04W 4/38* (2018.02); *H04W 12/12* (2013.01);
  (Continued)

(58) Field of Classification Search
  None
  See application file for complete search history.

(56) References Cited

U.S. PATENT DOCUMENTS

| | | | |
|---|---|---|---|
| 2008/0109387 A1* | 5/2008 | Deaver | G01R 19/16547 705/412 |
| 2012/0036250 A1* | 2/2012 | Vaswani | G01D 4/004 709/224 |

(Continued)

OTHER PUBLICATIONS

Patil et al., "Electrical Power Theft Detection and Wireless Meter Reading" International Journal of Innovative Research in Science, Engineering and Technology vol. 2, Issue 4, Apr. 2013 (Year: 2013).*

*Primary Examiner* — John C Kuan
(74) *Attorney, Agent, or Firm* — Donald R. Boys; Central Coast Patent Agency LLC (57) ABSTRACT

An apparatus reducing power theft on a micro power grid includes a server connected to the micro power grid, the server including a processor, data repository and software executing on the processor from a non-transitory medium the software enabling collection over time of bi-directional current data from smart distribution nodes connected to identified segments of the micro power grid and from smart meters distributed to one or more client demarcation points on the identified segments, processing of the bi-directional current data to determine power theft event frequency and power theft current information, assigning of a class to the individual ones of identified segments according to results of processing, and resetting of the number of packet transmission hop counts between the smart distribution nodes on identified segments and resetting the time period interval between subsequent power theft check routines for each identified segment based upon the classification data.

20 Claims, 6 Drawing Sheets

(51) Int. Cl.
*H04W 12/12* (2009.01)
*G01R 22/06* (2006.01)
*G01R 19/25* (2006.01)
*H04L 29/08* (2006.01)

(52) U.S. Cl.
CPC ........ *G01R 19/2513* (2013.01); *G01R 22/066* (2013.01); *H04L 67/12* (2013.01); *H04Q 2209/60* (2013.01); *Y02D 70/00* (2018.01); *Y02D 70/142* (2018.01); *Y02D 70/162* (2018.01); *Y04S 40/164* (2013.01); *Y04S 40/18* (2018.05); *Y04S 40/24* (2013.01)

(56) References Cited

U.S. PATENT DOCUMENTS

| | | | | |
|---|---|---|---|---|
| 2013/0151177 | A1* | 6/2013 | Hughes | G06F 1/28 702/60 |
| 2014/0067325 | A1* | 3/2014 | McKee | H04Q 9/00 702/183 |
| 2014/0297206 | A1* | 10/2014 | Silverman | G01R 22/063 702/58 |
| 2014/0300210 | A1* | 10/2014 | Abi-Ackel | H04Q 9/00 307/130 |
| 2014/0368189 | A1* | 12/2014 | Bernheim | G01R 22/066 324/115 |
| 2015/0323344 | A1* | 11/2015 | Arlitt | G01D 4/00 340/870.02 |

* cited by examiner

| MGA | f(PT) | Avg (iPT) |
|---|---|---|
| 1 | 15 | 19 |
| 2 | 20 | 18 |
| 3 | 17 | 16 |
| 4 | 18 | 17 |
| 5 | 2 | 8 |
| 6 | 1 | 6 |
| 7 | 4 | 10 |
| 8 | 3 | 7 |
| 9 | 13 | 5 |
| 10 | 16 | 10 |
| 11 | 12 | 8 |
| 12 | 5 | 15 |
| 13 | 8 | 17 |
| 14 | 6 | 14 |

APPARATUS FOR POWER THEFT DETECTION ON AN ELECTRICAL POWER GRID

CROSS-REFERENCE TO RELATED DOCUMENTS

The present application is a non-provisional application of U.S. provisional application 62/032,207, filed Aug. 1, 2014, disclosure of which is incorporated herein in its entirety by reference.

BACKGROUND OF THE INVENTION

1. Field of the Invention

The present invention is in the field of electric grid management and pertains particularly to methods and apparatus for reducing power requirements and network costs associated with detecting and reporting power theft on a micro power grid.

2. Discussion of the State of the Art

In the field of electric grid management, it is desired to reduce or eliminate the theft of power from a power grid. Theft of electricity from the power grid is more prevalent in developing countries like India for example where power theft losses amount to roughly one and one-half percent of gross domestic product (GDP). A micro power grid is a networked topology of intelligent processing nodes capable of collecting and processing information and of reporting collected information from node to node and eventually to a control facility via wireless communications.

The process of detecting power theft events that are not transmission losses due to natural events or other unexplained losses in power involves the collection and processing of power usage data on the grid and at least one algorithm for isolating the power theft current data from other available data relative to power usage.

A power theft detection algorithm known to the inventor is used to determine and isolate power theft data from other data on a micro grid. One challenge in power theft detection on a micro grid is that monitoring grid state and reporting power thefts via a plurality of intelligent processing nodes raises cost of communications for the particular network or topology of those distributed nodes on the grid.

Another challenge with sustaining power theft detection and reporting on the grid is that the components of the wireless communications network are typically distributed in overlay fashion over the power grid topology and also draw their power from the grid. Therefore, having these components always in an on state or requiring those components to stay on for longer "wake" periods to handle communications load can lead to sustainability issues regarding available energy on the grid. Furthermore, handling often piggybacked multi-hop data messages creates more network latency on the administrative portion of the grid and can result in bill processing delays.

Therefore, what is clearly needed is an apparatus that reduces power requirements and network costs associated with detecting and reporting power theft on a micro power grid.

BRIEF SUMMARY OF THE INVENTION

According to an embodiment of the present invention, an apparatus is provided that reduces power requirements and network cost associated with detecting and reporting power theft on a micro power grid. The apparatus includes at least one server connected to the micro power grid, the at least one server including a processor coupled to at least one data repository and software executing on the processor from a non-transitory medium the software providing collection, over a period of time, of bi-directional current data from a plurality of smart distribution nodes connected to individual ones of identified segments of the micro power grid, the distribution nodes collecting bi-directional current data from a plurality of smart meters distributed to one or more client demarcation points on the identified segments, processing the bi-directional current data to determine power theft event frequency and power theft current information, assigning a class to the individual ones of identified segments according to results of processing of the bi-directional data, and resetting the number of packet transmission hop counts between the plurality of smart distribution nodes on each of the individual ones of identified segments and resetting the time period interval between subsequent power theft check routines for each of the individual ones of identified segments based upon the classification data.

In one embodiment, the collected data is processed to determine frequency of power theft detections and average power theft current on each identified segment of the micro power grid for the specified period. In one embodiment, the classification includes frequently identified, occasionally identified, or extremely unlikely identified micro power grid segment as a source of power theft information. In one embodiment, the transmission of collected data between the plurality of smart meters, the plurality smart distribution nodes, and the at least one server is performed wirelessly. In one embodiment, the plurality of smart distribution nodes occupy one or more than one micro power grid segment and are descendants of a smart distribution node that communicates directly with the at least one server. In one embodiment, the smart distribution nodes and the smart meters each include at least one current sensor wired to a current transmission line or device on the micro power grid. In one embodiment, the power theft current is determined within a plus or minus error value range.

In one embodiment, the individual segments are micro power grid areas that are interconnected by individual ones of the smart distribution nodes to form the micro power grid. In one embodiment, the hop count is reduced or maintained at a minimum count for individual segments classified as extremely unlikely identified as a power theft source. In one embodiment, the bi-directional current data is reported by sending data packets upstream from each smart distribution node according to pre-set hop count. In a variation to this embodiment, each smart distribution node measures the current going through it and adds the data to the data received at that node from all of the descendants of that node.

In one embodiment, power theft current is expressed as a ratio of average power theft current for an identified segment over average current draw made by consumers connected to that segment. In one aspect the total hop count set for an identified micro power grid segment depends at least partially on the wireless communications range of the smart distribution nodes. In one embodiment of the invention, a fifth function is provided rotating the hop addresses for a reduced hop count while maintaining the same hop count.

According to an aspect of the present invention, a method is provided that reduces power requirements and network cost associated with detecting and reporting power theft on a micro power grid comprising steps collecting over a period of time, by at least one server including a processor coupled to a data repository software executing on the processor from a non-transitory medium, bi-directional current data from a plurality of smart distribution nodes connected to individual ones of identified segments of the micro power grid, the distribution nodes collecting bi-directional current data from a plurality of smart meters distributed to one or more client demarcation points on the identified segments, processing the bi-directional current data to determine power theft event frequency and power theft current information, assigning a class to the individual ones of identified segments according to results of processing of the bi-directional data, and resetting the number of packet transmission hop counts between the plurality of smart distribution nodes on each of the individual ones of identified segments and resetting the time period interval between subsequent power theft check routines for each of the individual ones of identified segments based upon the classification data.

In one aspect of the method, the collected data is processed to determine frequency of power theft detections and average power theft current on each identified segment of the micro power grid for the specified period. In one aspect, the classification includes frequently identified, occasionally identified, or extremely unlikely identified micro power grid segment as a source of power theft information. In one aspect, the transmission of collected data between the plurality of smart meters, the plurality smart distribution nodes, and the at least one server is performed wirelessly.

According to one aspect of the method, the plurality of smart distribution nodes occupy one or more than one micro power grid segment and are descendants of a smart distribution node that communicates directly with the at least one server. In one aspect the smart distribution nodes and the smart meters each include at least one current sensor wired to a current transmission line or device on the micro power grid.

DETAILED DESCRIPTION OF THE INVENTION

In various embodiments described in enabling detail below the inventor provides apparatus and methods for controlling how power theft information is collected and processed on a micro grid of a "smart" electricity distribution grid. The present invention is described using the following examples, which may describe more than one relevant embodiment falling within the scope of the invention.

Figure 1:
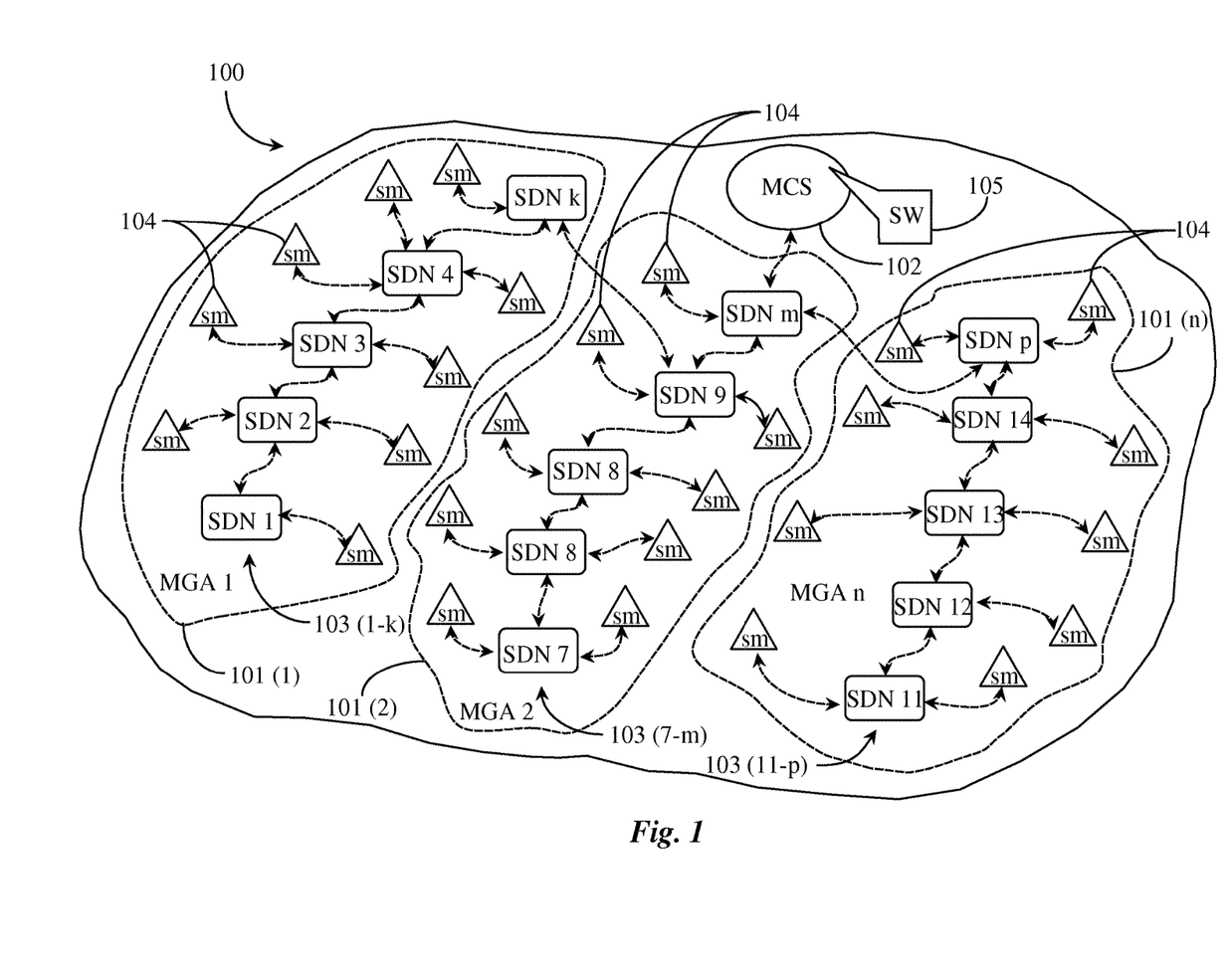
FIG. 1 is an architectural view of a micro power grid divided into individual grid segments in an embodiment of the present invention.

FIG. 1 is an architectural overview of a micro power grid 100 divided into individual grid segments in an embodiment of the present invention. Micro Power Grid 100 may be part of a larger smart electricity distribution grid. Micro grid 100 comprises a number of topologically isolated grid segments 101 (1-$n$), also referred to herein as micro grid areas (MGAs). An MGA may include connected power consumers located along an electricity distribution line or branch of the grid.

Each MGA 101 (1-$n$) includes a plurality of smart distribution nodes (SDNs) arranged in overlay fashion along an electricity distribution path through the topology of the MGA. MGA 101 (1) includes SDNs 103 (1-$k$) distributed along the path of electricity distribution such as one per pole for elevated power lines. Each SDN 103 (1-$k$) includes a processor or microcontroller, and at least one current sensor that measures current going through the line in both directions. MGA 101 (2) includes SDNs 103 (7-$m$) and MGA 101 ($n$) includes SDNs 103 (11-$p$).

It is important to note herein that a MGA may include more than a single electricity distribution main, cable, branch, or path without departing from the spirit and scope of the present invention. SDNs 103 (1-P) represent a total number of SDNs in visible micro grid 100. There may be more or fewer SDNs integrated to micro grid 100 without departing from the spirit and scope of the present invention. SDNs 103 (1-$k$) in MGA 101 (1) are enabled to communicate with one another by onboard wireless communications modules each having a range that at least reaches a next SDN in line. The communications may be hosted by a wireless fidelity (WiFi) network, a Zigbee wireless network, or other wireless services should they be available and more appropriate for the distribution architecture of the SDNs.

Each MGA 101 (1-$n$) includes a plurality of smart meters (SMs) 104. SMs 104 are designed for distribution to consumer sites within range of communication of one or more SDNs. SMs 104 include at least one current sensor that is capable of measuring the current through the meter bi-directionally. There may be one or more SMs distributed to a power consuming location such as a smart home network or commercial network. One SDN may regularly communicate with one or more than one SM 104 in real time.

A SM 104 includes one or more sensors to measure current bi-directionally as it flows through the meter. SMs 104 measure the current in both directions and communicate via wireless communications module with the closest SDN. In this way a tree-like topology for the micro power grid is provided in overlay fashion and the components are integrated (hard wired/plugged into) to the power grid. SMs 104 represent the bottom level in component hierarchy and report to the nearest SDNs within range. Each SDN 103 (1-$p$) measures the current flowing through it and forwards the data upstream to the next SDN in a current packet (CP). In this particular example, there is one top or parent SDN 103 ($m$) within MGA 101 (2). The process repeats at each SDN in the line within each MGA 101 (1-$n$).

SDNs may receive CPs from all of the descendant nodes and may extract and average the values, including the direction vectors indicating the direction of the current. Therefore each SDN processes data received from all of the currently active descendant nodes and passes the information upstream to the next node before becoming inactive again during the routine.

Micro grid 100 includes a micro grid control (MCS) station 102 analogous to a master server that controls the micro grid segment-by-segment, introducing flexibility in control options for the entire micro grid. MCS 102 includes at least one processor 202 and is coupled to at least one data repository. MCS 102 also hosts software (SW) 105 executing on the at least one processor from a non-transitory medium. MCS 102 communicates directly with the top or parent SDN 103 (*m*). SW 105 includes instructions for collecting and processing information from down-line components on the micro grid to obtain power theft information for each MGA comprising micro grid area 100 under control of MCS 102. SW 105 utilizes the resulting data calculated by algorithm for each MGA 101 (1-*n*) to classify each of the MGAs according to the data analyzed.

In classifying the MGAs the system learns which of those MGAs are experiencing higher power theft issues and which of those MGAs are not. SW 105 includes instruction for resetting the time interval between a power theft check for an MGA and instruction for changing or adjusting the hop count (number of node hops up stream for data packets). This process may or may not be initiated for an MGA because initiation may depend upon the classification assigned to an MGA under control of the MCS. Moreover, the process is dynamic and may be set to occur upon MCS determination of a change in classification for an MGA under its domain. The hop count is equal to the number of times a packet must stop at an SDN for processing. In one embodiment, packets may pass through an SDN without interception for processing such as if the particular SDN was subtracted from the previous hop count. Packets may also completely bypass an SDN (SDN dropped) and sent to the next one further upstream provided the target SDN is within wireless communications range.

Generally speaking, a MGA that is classified as having higher power theft ratio may be monitored at more nodes (higher hop count) and therefore may experience a longer power theft check period duration. MGAs that experience a much lower power theft ratio may have hop counts reduced which may lead to shorter power theft check duration. In one embodiment where hop counts are reduced along an MGA line, the remaining hop counts may be kept stable while the hop addresses (SDNs) are rotated periodically adding and subtracting the same number of addresses at each rotation to maintain the same hop count.

Figure 2:
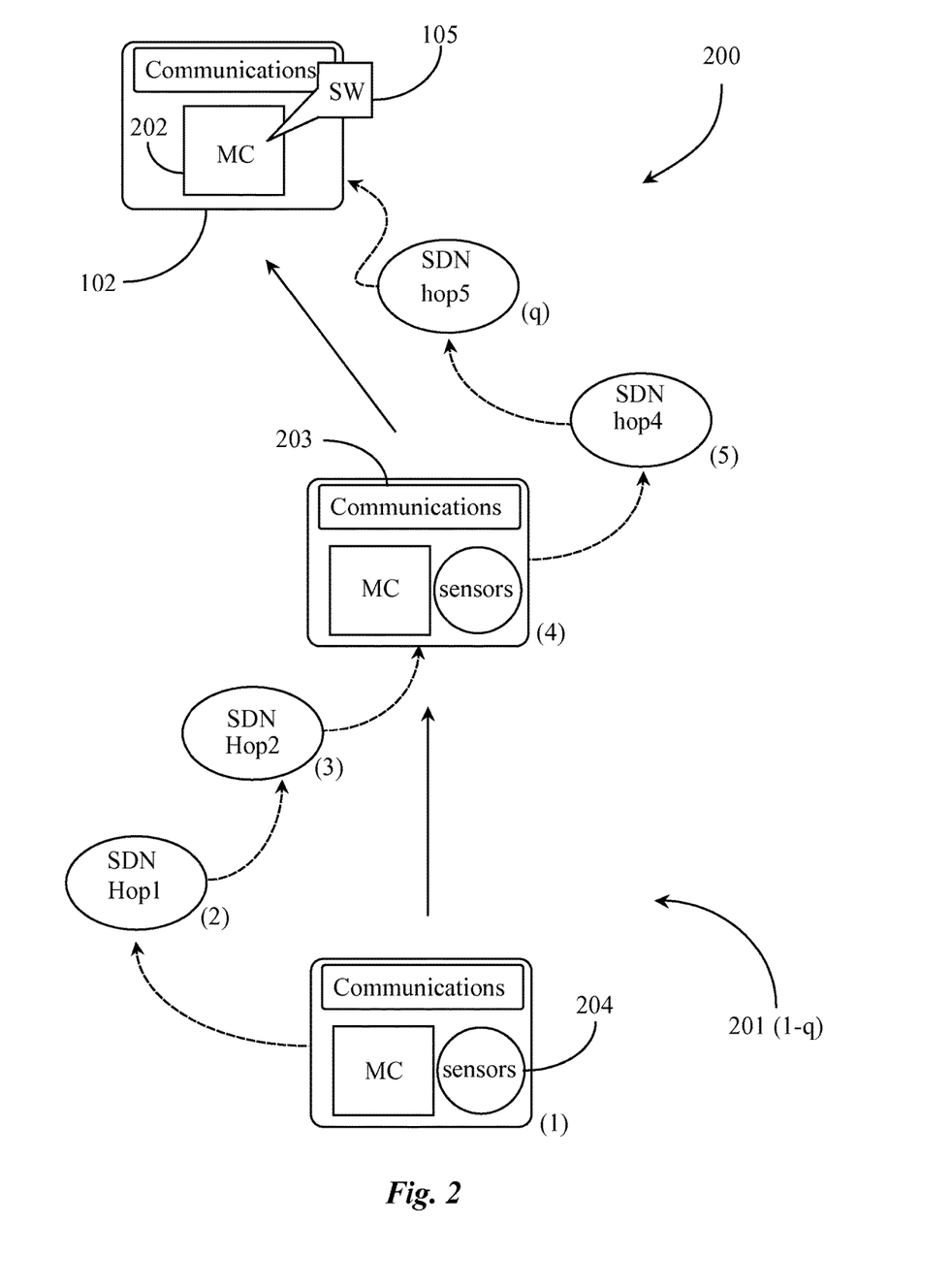
FIG. 2 is a block diagram depicting smart distribution nodes downstream from a micro grid control station.

FIG. 2 is a block diagram depicting micro grid area line 200 with smart distribution nodes downstream from a micro grid control station. Smart distribution nodes (SDNs) 201 (1-*q*) are analogous in description to any of SDNs 103 (1-*p*) of FIG. 1. In this example a single hierarchal line of SDNs represent an arm of the micro grid or a micro grid area (MGA). SMs are not depicted in this example but may be assumed present.

Each SDN 201 (1-*q*) has one or more sensors 204 to measure current going through the device in both directions in the line. For example there may be one SDN at every power pole having branch off to consumers. During a power theft check routine, each SDN measures and records the total current going through it sending the recorded information upstream. Each SDN waits for packets from descendant SDNs downstream that include the current values recorded at those locations on the grid. At the top of the SDN hierarchy the reported current values of the descendant SDNs and connected SMs may be extracted and summed. All of the current information from bottom layer SMs to the parent SDN for the micro grid is aggregated at micro control station (MCS) 102 also depicted in FIG. 1. The information includes direction vectors indicating the direction of the current measured at each reading collected and for computed current averages. Each SDN 201 (1-*q*) includes a wireless communications module 203 for communications and a micro controller (MC) for processing data.

In this example data is depicted as being passed upstream to MCS 102 executing SW 105. In one embodiment a total hop count may be enforced that includes stops at each SDN on line 200 before MCS 102 receives all of the power theft data. The total hop count equals five hops from SDN 201 (1) representing the most remote SDN from the MCS. In one embodiment reducing the hop count simply means eliminating some SDN addresses from the destination list. In this example, SDNs 201 (2), (3), (5), and (*q*) may be eliminated from the hop count. In this case the hop count is reduced to one hop at SDN 201 (4) before MCS 102 receives the data as illustrated by solid arrows between the active or "awake" nodes.

In one embodiment reducing the hop count also deactivates the eliminated SDNs from reporting at all during a power check theft routine. In this embodiment the hop count may be maintained during a subsequent power theft check routine while the hop count addresses are rotated out eliminating nodes that reported in the last check and incorporating the nodes that were eliminated in the last check. Such leeway is allowable if classification of an MGA results in very low power theft ratio to total current.

In one embodiment hop counts can be reduced without eliminating participation of a node in the power theft check data collection. For example, different hop patterns such as stop at "every other node in the line of nodes" In one embodiment the wireless range of a communications module 203 may be a factor that influences the degree of hop count adjustment (to lower counts). An SDN may only communicate with other SDNs that are within wireless range. However the wireless range may vary widely depending on infrastructure involved.

In one embodiment hop counts are reduced for an MGA line of components such as line 200 leading to a shorter period of runtime during a power theft check because each SDN waits for fewer messages arriving from downstream components. Also, the time period between power theft check routines for an MGA may be lengthened according to algorithmic processing of current data for the MGA and its resulting classification. This allows power conservation with respect to the power requirements of the nodes on the grid by enabling less processing time individually and more sleep time between power theft routines. Likewise, the reverse may also happen (rise in hop count and shortening of time interval between checks) according to the most recent data results and classification of an MGA. In this way MGAs on the micro grid that have higher power theft statistics receive more scrutiny while areas reporting lower power theft statistics receive less scrutiny.

Figure 3:
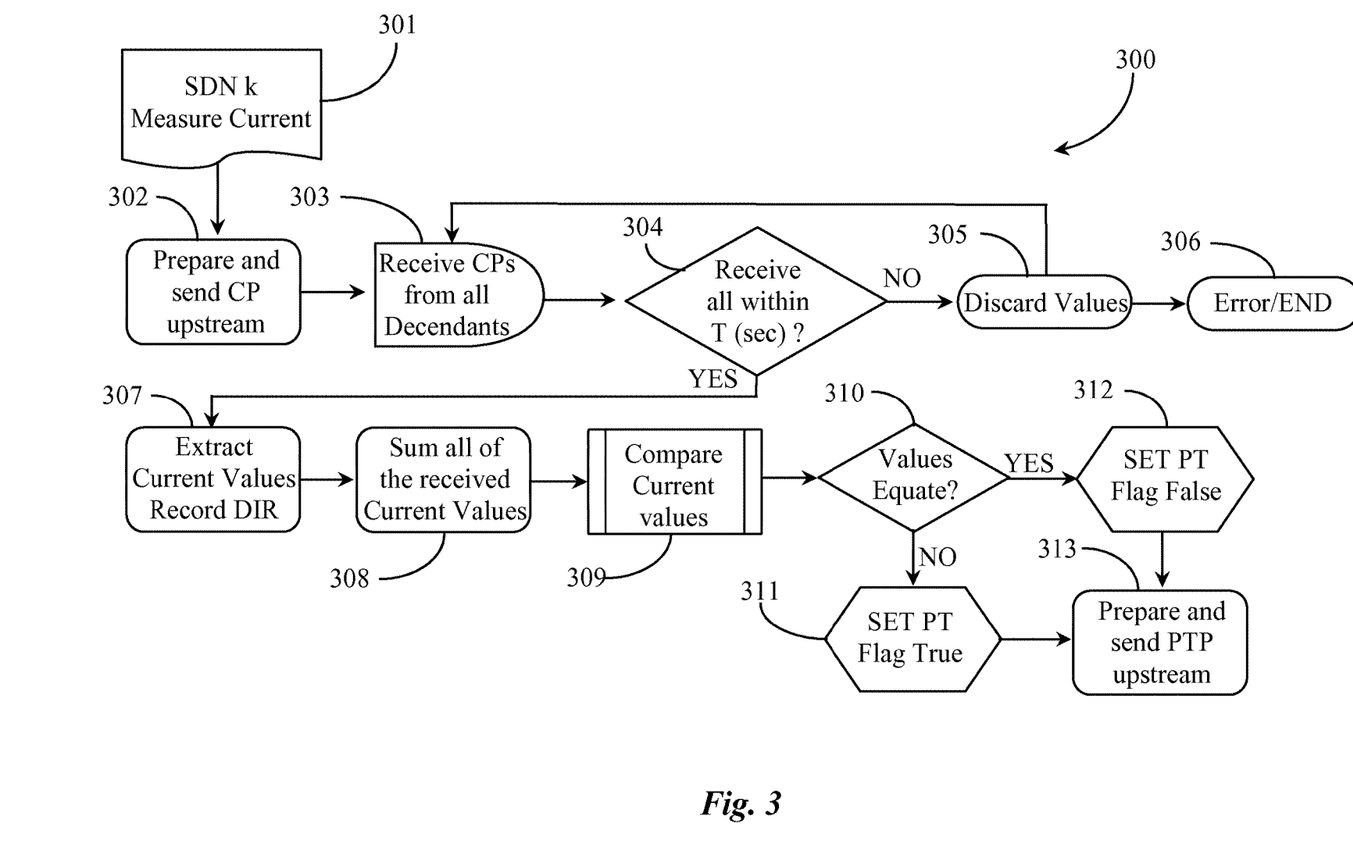
FIG. 3 is a process flow chart depicting steps in determining power theft on a micro grid segment.

FIG. 3 is a process flow chart 300 depicting steps in determining power theft on a micro grid segment. At step 301, a smart distribution node such as SDN 101 (*k*) of FIG. 1 measures and records the total amount of current (ik) going through it in both directions. In one embodiment the current through the SDN may be measured using Kirchhof's Current Law (KCL) know to the inventor. At step 302, the SDN generates and sends a current packet (CP) upstream to the next SDN on the current hop list. The current packet sent may minimally include the source identification (ID) of the sending node, the direction of the current measured, and the total amount of the current measured, the time stamp for the measurement, and the destination ID to the next node on the hop list. Current values for both directions may be included in the same current packet without departing from the spirit and scope of the present invention.

The SDN waits to receive all of the current packets (CPs) from all of its active descendant nodes at step 303. At step 304 the SDN may make a determination if it has received all of the expected current measurements from the descendant nodes in the MGA tree. In one embodiment a timeout period may be enforced wherein the SDN must receive all of the data or 100% reporting before the period is set to expire. At step 304, if the SDN has not been able to receive data from all of the expected descendant nodes within the time period, the SDN may abandon all of the values that were received in step 305 and perform an error/end operation at step 306. This may end the process for the particular SDN or the SDN may try again a number of times before ending. In the case of retry, the SDN may re-measure the current going through it and send another CP packet. In case of error, the error message sent from the SDN may be to notify administration entities to look at and fix any problems such as node failure, line failure, etc.

If at step 304 the SDN has accounted for all of the expected messages, it extracts at step 307 all of the current values reported including direction information (DIR) flag indicating the direction of the current readings. At step 308 the SDN may sum all of the current values for both directions. The summation might be expressed as $$i_{dk} = \Sigma_{j=1}^{n} i_{dir}^{j} \times i_j \qquad (1)$$

At step 309 the SDN may compare the summed current values with the current values recorded for that SDN. At step 310 it is determined whether or not the values can be equated to one another within an acceptable level that might account for transmission (TX) loss (copper loss), and an acceptable error range expressed in the data [if ik==idk−TX Loss+/−Err val].

If at step 310 the values are equal within the pre-defined error range, the SDN may determine to set a power theft indication flag to false at step 312 indicating low or no power theft issues with that data. If the SDN determines that the values do not equate satisfactorily, the SDN may set the power theft flag to true at step 311, indicating power theft detection. The SDN may prepare at step 313 a power theft packet (PTP) containing the results of the information processed at that node and send it upstream according to one embodiment to the controlling MCS. The power theft (PT) message may minimally contain the source identification (ID) of the sending node, the direction of the PT current detected, the total amount of the PT current, the time stamp for the calculated results, the PT flag setting, and the destination ID to the MCS that controls the MGA.

It is important to note that the process of summing and comparing current values may be allotted to each SDN on a distribution line or to just the SDN retaining the highest position in the SDN hierarchy for an MGA. In that case the last SDN may contain the logic or instruction to perform those routines described above. In another embodiment each MGA has a top SDN that reports directly to a single MCS that controls the micro grid. In this embodiment the MCS may process the raw data collected from the descendant nodes in each MGA of the micro grid without departing from the spirit and scope of the present invention. In another embodiment each SDN performs the same processing and messaging tasks with each SDN in the line re-calculating results after reporting its own current data. The algorithm that is used to calculate the power theft data is known to the inventor as a power theft detection algorithm (PTDA).

The algorithm in basic format may be expressed as follows:
Measure current (ik)
Send CP message
Wait(t<Tsec) until Receive[CP1, CP2, . . . , CPn]
if(!Receive[CP1, CP2, . . . , CPn]&&t>Tsec)
Discard CP1, CP2, . . . , CPn
After 'm' number of rejection of CPs, Send message to MCS
else if((Receive[CP1, CP2, . . . , CPn]&&t<T
Extract current values i1, i2 . . . in
Insert sign according to the direction $i_{jdir}$
15. $i_{dk} = \Sigma_{j=1}^{n} i_{dir}^{j} \times i_j$
16. Compare($i_k$, $i_{dk}$),
17. if($i_k == i_{dk} - Tx_{loss} \pm Err_{val}$)
18. $PT_{flag}$=false
19. end if
20. elseif($i_k = i_{dk} \cdot Tx_{loss} \pm Err_{val}$)
21. $PT_{flag}$=true
22. Send PTmsg($src_{ID}, i_{dir}, i_{PT}$, $PT_{flag}$=true, time_stamp, mc-$s_{ID}$) to MCS.
23. end if
24. end if In one embodiment of the invention, step 302 may be performed after step 304 if it is determined that the SDN has received all messages from descendants within the time T. If T expires before all messages are received, then step 302 may not be performed to reduce redundancy.

Figure 4:
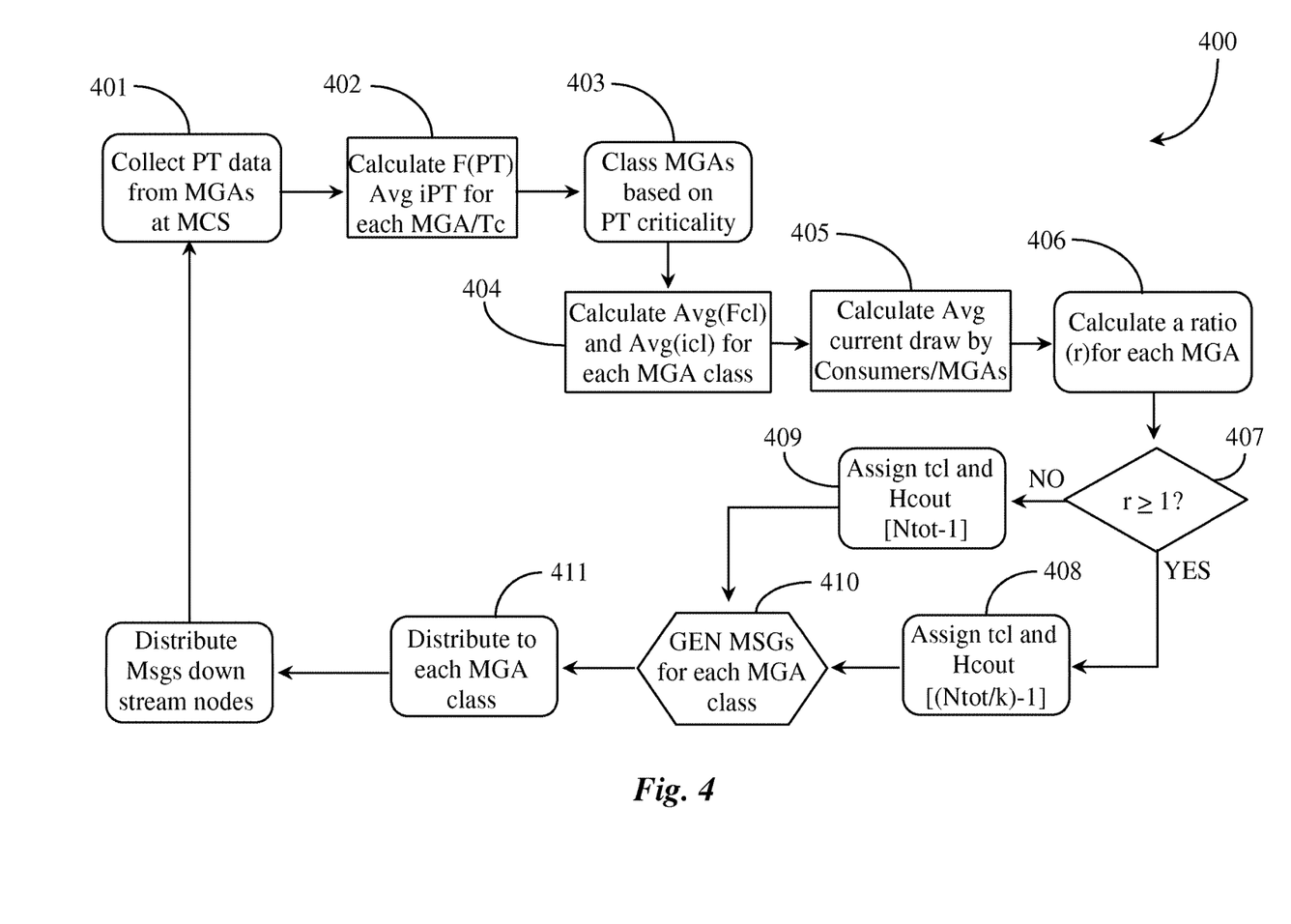
FIG. 4 is a process flow chart depicting steps in dynamic adjustment of power theft check periods and the number of current data transmission hops enforced for individual micro power grid segments in an embodiment of the present invention.

FIG. 4 is a process flow chart 400 depicting steps in dynamic adjustment of power theft check periods and the number of current data transmission hops enforced for individual micro power grid segments in an embodiment of the present invention. Process 400 may be added onto the end of process 300 described above. At step 401 all of the power theft (PT) data for each MGA on the micro grid under MCS control are collected at the controlling MCS. The power theft data is collected using the power theft detection algorithm (PTDA) described further above for Tc duration (time of data collection). An algorithm is provided and termed by the inventor Efficient Power Theft Data Networking Algorithm (EPTDNA). EPTDNA works with PTDA to more efficiently communicate and collect the power theft information. The power theft data is collected from all of the MGAs under the control of the MCS. Tc might be in the order of days or weeks.

At step 402 the MCS with the aid of SW analogous to SW 105 of FIG. 1, calculates the frequency (F) of detected power theft (PT) events and the average power theft current iPT for each MGA during the time Tc, which is the time allotted for collection of PT data for a MGA. Based on the power theft data calculations, the MGAs are each classified at step 403 according to the criticality of the data results using an available algorithm such as medoid or k-means. In one example, there may be three categories such as frequently identified MGA (FMGA), occasionally identified MGA (OMGA), and extremely unlikely identified MGA (EUMGA). Power theft statistics are higher in FMGAs, lower in OMGAs and lower still in EUMGAs. There may be more or fewer categories of classifications of power theft criticality without departing from the spirit and scope of the present invention.

At step 404, the MCS with the aid of SW 105 of FIG. 1 calculates the average frequency of power theft data in each class (Fcl) of MGAs and the average power theft current (icl) for each class of MGAs. At step 405 the MCS calculates the average maximum current draw by consumers (icon) for all the MGAs under control of the MCS. At step 406 the MCS calculates a ratio (r) for each MGA under the control of the MCS where the ratio equals the average maximum consumer draw on the MGA divided by the average power theft current iPT for the MGA. At step 407 the MCS determines if r is greater than or equal to 1 for each MGA.

If r is equal to or greater than 1 in step 407 the process moves to step 408 where the MCS sets tcl (time duration before a periodic power theft check may occur on the MGA). The MCS also sets the transmission hop count (Hcout) for the MGA as the total number of nodes divided by the k factor −1. If else at step 407, then the process moves to step 409 where the MCS sets tcl and the Hcout for the MGA as the total number of nodes −1 [Ntot−1]. In the case of r being greater than or equal to 1, the tcl=the average Tc value or (Tcl) for the MGA class. Tc is the time duration for the EPTDNA phase-one data collection time duration for an MGA. In the case of r being less than one, then tcl is=to Tcl multiplied by r. Steps 409 and 408 are assigned for a class of MGAs. Therefore, every MGA in a particular class of MGAs will be assigned tcl and Hcout.

At step 410 the MCS generates messages to each of the MGAs in a class of MGAs under control of the MCS. These messages are distributed at step 411. A message assigning tcl and Hcout to a class of MGAs is distributed only to SDNs in those MGAs. The parent SDNs (closest to MCS) in each MGA may be responsible for distributing the information to descendant components (SDNs) within each MGA. SDNs may also update smart meters located in the same MGAs hosting those SDNs. The new tcl and Hcout for an MGA classification replaces the old setting and persists through the next Tc duration.

Figure 5:
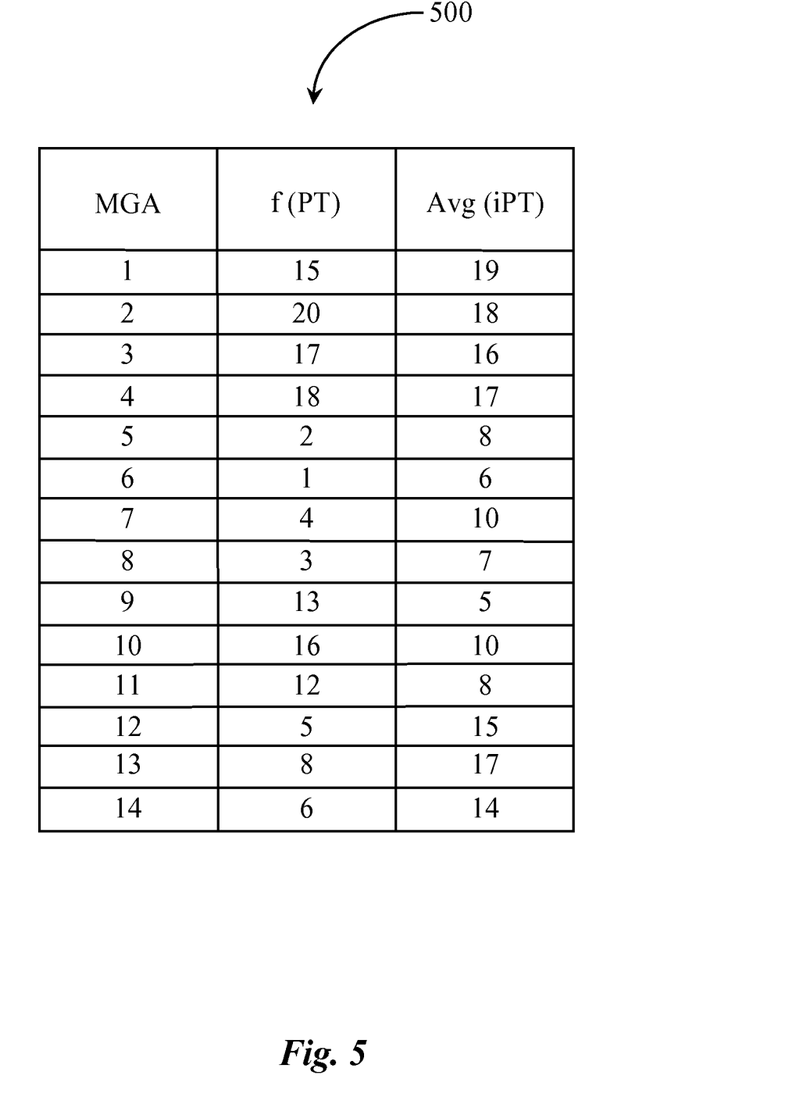
FIG. 5 is a table depicting power theft frequencies and average power theft currents recorded during a power check time period for a number of identified micro power grid segments.
Figure 6:
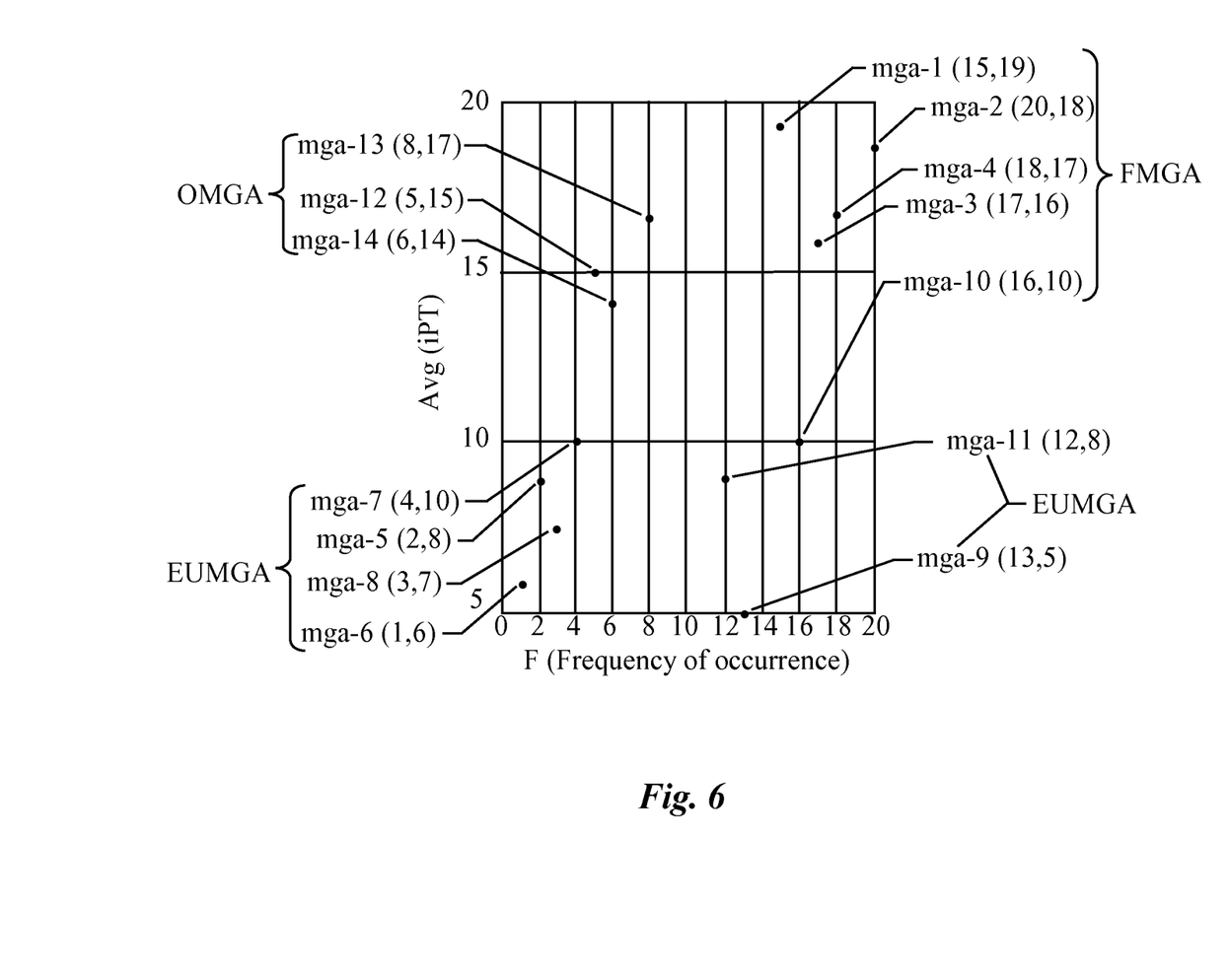
FIG. 6 is an x/y graph depicting the plotted locations of the micro power grid segments of FIG. 5.

FIG. 5 is a table depicting power theft frequencies and average power theft currents recorded during a power check time period (Tc) for a number of identified micro power grid segments. FIG. 6 is an x,y graph depicting the plotted locations of the micro power grid segments of FIG. 5.

Referring to FIG. 5, the identified micro grid segments listed in table 500 are referred to by the inventor as Micro Grid Arrays (MGAs). In table 500, the first column under MGA lists 14 MGAs making up a micro grid controlled by a micro grid control station (MCS).

Listed in the column adjacent to the MGA column, are the numbers of power theft events detected as a result of processing collected current data for the MGAs. The numbers represent frequency of detections over the duration Tc for each MGA. Table 500 includes a third column listing the average power theft current [Avg (iPT)] for each of the fourteen MGAs making up the micro grid. Current is measured in amperes.

The data provided in table 500 is utilized to classify each of the MGAs according to three classes of MGAs namely frequently identified MGA (FMGA), occasionally identified MGA (OMGA) and extremely unlikely MGA (EUMGA). There may be more or fewer that three categories without departing from the spirit and scope of the present invention. It is also important to note herein that both the frequency of power theft events and the average power theft current are used as input to calculate a class for an MGA using an algorithm adapted for the purpose like medoid or k-means described further above.

Other tables might be derived and made available such as a table depicting the average frequency of power theft (Fcl) for a class of MGAs and the average power theft current [Avg (icl)] for the class. Still another table may depict the average time (Tcl) in days allotted for power theft check data collection and processing for a class of MGAs, the power theft ratio (r) calculated and averaged for the class, and the average time expiring after Tcl ends and before periodic power checks begin for the class.

Referring now to FIG. 6, an x,y graph depicts the plotted positions of classified MGAs one through fourteen listed in FIG. 5 above according to the data. On this two-dimensional graph, x=the frequency (F) of power theft data events detected during period Tc and y=the average power theft current draw [Avg (iPT)].

MGAs classified as FMGAs include MGAs 1-4 and 10 clustered generally to the upper right portion of the graph. MGAs classified as OMGAs include MGAs 12-14 generally clustered to the left and upper portion of the graph. MGAs classified as EUMGAs 5-9 and 11 generally clustered in the left lower portion of the graph.

Classification of MGAs associated with a lower power theft frequency and average current draw may result in adjustment in the number of times or hops that messages on the classified MGAs must undergo before reaching the MCS controlling those MGAs. Thus, Tc (time for data collection and processing) may be shortened due to lower messages processing load and network latency. Moreover, power theft check intervals for those classified MGAs may be adjusted higher enabling the nodes drawing power from the micro grid to sleep longer in a low power mode like sleep mode or standby mode or powered off for longer periods.

EPTDNA enables network flexibility and frees up more bandwidth to enabling better focus on the more urgent power theft trends affecting the micro grid. It will be apparent to one with skill in the art of networking that a MCS in control of a micro grid may communicate with other MCSs controlling adjacent micro grids installed across a region. Therefore, reductions in network latency, and node processing times on a micro grid may be accumulative across the larger smart distribution power grid.

It will be apparent to one with skill in the art that the power theft detection control system of the invention may be provided using some or all of the mentioned features and components without departing from the spirit and scope of the present invention. There may be many alterations made in the descriptions without departing from the spirit and scope of the present invention.

It will also be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. An apparatus for reducing power requirements and network cost associated with detecting and reporting power theft on a micro power grid, comprising:
    at least one server connected to the micro power grid, the at least one server including a processor coupled to at least one data repository and software executing on the processor from a non-transitory medium, the software, providing:
    collecting over a period of time, bi-directional current data from a plurality of smart distribution nodes connected to individual ones of identified segments of the micro power grid, the distribution nodes collecting bi-directional current data from a plurality of smart meters distributed to one or more client demarcation points on the identified segments;

processing the bi-directional current data to determine power theft event frequency and power theft current information;

assigning a class to the individual ones of identified segments according to results of processing of the bi-directional current data; and resetting a number of packet transmission hop counts between the plurality of smart distribution nodes on each of the individual ones of identified segments and resetting a time period interval between subsequent power theft check routines for each of the individual ones of identified segments based upon the assigned class.

2. The apparatus of claim 1 wherein the collected bi-directional current data is processed to determine frequency of power theft detections and average power theft current on each identified segment of the micro power grid for the period of time.

3. The apparatus of claim 1 wherein the assigned class includes frequently identified, occasionally identified, or extremely unlikely identified micro power grid segment as a source of power theft information.

4. The apparatus of claim 1 wherein transmission of collected data between the plurality of smart meters, the plurality smart distribution nodes, and the at least one server is performed wirelessly.

5. The apparatus of claim 1 wherein the plurality of smart distribution nodes occupy one or more than one micro power grid segment and are descendants of a smart distribution node that communicates directly with the at least one server.

6. The apparatus of claim 1 wherein the smart distribution nodes and the smart meters each include at least one current sensor wired to a current transmission line or device on the micro power grid.

7. The apparatus of claim 1 wherein the power theft current information is determined within a plus or minus error value range.

8. The apparatus of claim 1 wherein the individual ones of identified segments are micro power grid areas that are interconnected by individual ones of the smart distribution nodes to form the micro power grid.

9. The apparatus of claim 1 wherein a hop count is reduced or maintained at a minimum count for individual segments classified as extremely unlikely identified as a power theft source.

10. The apparatus of claim 1 wherein the bi-directional current data is reported by sending data packets upstream from each of the smart distribution nodes according to a pre-set hop count.

11. The apparatus of claim 10 wherein each of the smart distribution nodes measures a current going through it and adds the bi-directional current data to the bi-directional current data received at that node from all of the descendants of that node.

12. The apparatus of claim 1 wherein power theft current is expressed as a ratio of average power theft current for an identified segment over average current draw made by consumers connected to that segment.

13. The apparatus of claim 4 wherein a total hop count set for an identified micro power grid segment depends at least partially on a wireless communications range of the smart distribution nodes.

14. The apparatus of claim 1 including a fifth function rotating hop addresses for a reduced hop count while maintaining a same hop count.

15. A method for reducing power requirements and network cost associated with detecting and reporting power theft on a micro power grid, comprising steps:

collecting over a period of time, by at least one server including a processor coupled to a data repository software executing on the processor from a non-transitory medium, bi-directional current data from a plurality of smart distribution nodes connected to individual ones of identified segments of the micro power grid, the distribution nodes collecting bi-directional current data from a plurality of smart meters distributed to one or more client demarcation points on the identified segments;

processing the bi-directional current data to determine power theft event frequency and power theft current information;

assigning a class to the individual ones of identified segments according to results of processing of the bi-directional current data; and resetting a number of packet transmission hop counts between the plurality of smart distribution nodes on each of the individual ones of identified segments and resetting a time period interval between subsequent power theft check routines for each of the individual ones of identified segments based upon the assigned class.

16. The method of claim 15 wherein the collected bi-directional current data is processed to determine frequency of power theft detections and average power theft current on each identified segment of the micro power grid for the period of time.

17. The method of claim 15 wherein the assigned class includes frequently identified, occasionally identified, or extremely unlikely identified micro power grid segment as a source of power theft information.

18. The method of claim 15 wherein transmission of collected data between the plurality of smart meters, the plurality smart distribution nodes, and the at least one server is performed wirelessly.

19. The method of claim 15 wherein the plurality of smart distribution nodes occupy one or more than one micro power grid segment and are descendants of a smart distribution node that communicates directly with the at least one server.

20. The method of claim 15 wherein the smart distribution nodes and the smart meters each include at least one current sensor wired to a current transmission line or device on the micro power grid.

* * * * *